Feb. 24, 1942.         H. P. FISHER            2,274,324
                          SEAL
                    Filed Dec. 26, 1940

INVENTOR
Harry P. Fisher
BY
Evans + McCoy
ATTORNEYS

Patented Feb. 24, 1942

2,274,324

UNITED STATES PATENT OFFICE 2,274,324

SEAL

Harry P. Fisher, Wabash, Ind., assignor to The General Tire & Rubber Company, Akron, Ohio, a corporation of Ohio Application December 26, 1940, Serial No. 371,637

2 Claims. (Cl. 288—19)

This invention relates to seals, and more particularly to resilient and deformable seals for use in effecting a fluid tight seal between telescopically assembled pipe sections and the like. The present application is a continuation-in-part of my copending application Serial No. 303,415, filed November 8, 1939.

It is an object of the invention to provide an improved seal of deformable and resilient material which may be quickly and easily assembled in a pipe joint, and which affords a yieldable connection that effectively resists the passage of liquids and gases into and out of the pipe at the joint.

Another object is to provide a pipe sealing gasket or the like of a resilient, plastic material, such as rubber, which maintains a fluid seal between assembled pipe sections through its inherent elasticity.

More specifically, the invention aims to provide an improved seal formed of relatively thin flat portions of material so as to be readily collapsible, and which is yet effective to resiliently maintain an adequate fluid seal between the pipe ends.

Another object is to provide a seal which is relatively simple in design and construction and inexpensive to manufacture, a seal which may be quickly and easily assembled in pipe joints by unskilled workmen without the use of special tools or equipment and without special training or experience.

Other objects and advantages will become apparent from a consideration of the following detailed description of a suitable embodiment of the invention wherein various features of construction and design are set forth in detail.

Figure 1:
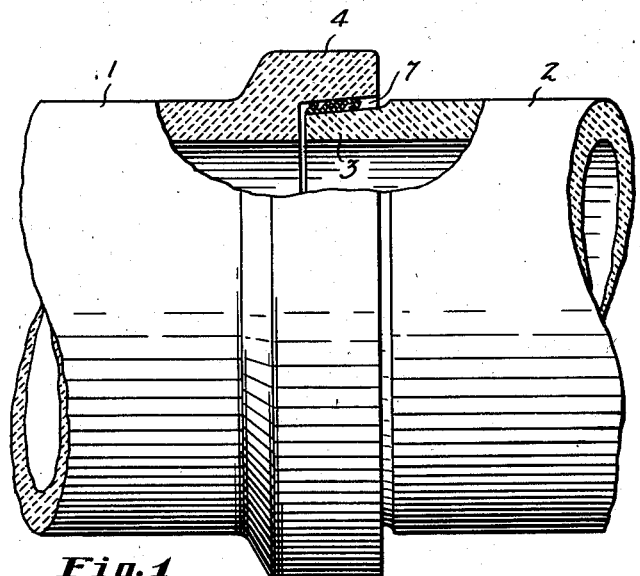
Figure 1 is a fragmentary, elevational view, partly in section, showing a pipe joint connection including my improved seal.

Referring to the drawing by numerals of reference which indicate like parts throughout the several views, the improved seal forming the subject matter of this invention is shown in Fig. 1 disposed between assembled pipes 1 and 2. These pipes may be of conventional construction and formed of either iron, concrete, or other well-known material. A spigot end 3 is formed on the end of the pipe 2 and is telescopically received within bell end 4 formed on the pipe 1. The bell 4 and the spigot 3 are formed with spaced, confronting surfaces 5 and 6, respectively, which provide an annular channel or groove 7 that accommodates the seal.

Figures 2, 3:
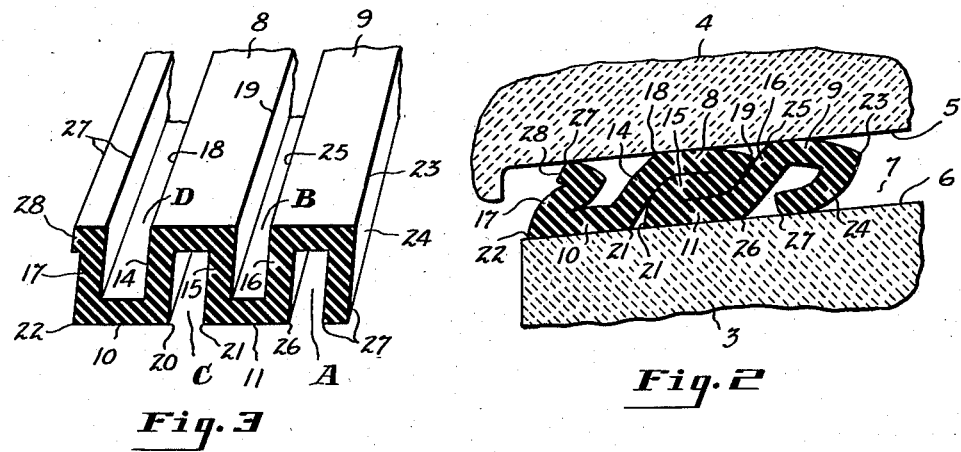
Fig. 2 is a fragmentary, sectional detail of the pipe joint connection of Fig. 1 and enlarged with respect thereto.
Fig. 3 is a fragmentary detail in perspective of my improved rubber seal.

In Figs. 1 and 2 the seal is shown in its deformed condition, resulting from the pressure applied to the opposite sides thereof by the surfaces 5 and 6 of the assembled pipe sections. In Fig. 3 the sealing strip is shown in its normal or unstressed shape or form. This seal is preferably made by an extrusion process and may be formed of any suitable rubber composition that is deformable and resilient when vulcanized. Preferably, the composition of the rubber material is determined so that the deformability and elasticity will correspond approximately to that used for the tread portions of automobile tires.

The seal is of integral structure and includes one series or set of thin flat portions 8 and 9, which are disposed in substantially a common plane and spaced from a second set of relatively thin flat portions 10 and 11 disposed in a second common plane which approximately parallels the plane of the portions 8 and 9. Extending between said planes and connecting the edges of the portions 8 and 9 with the edges of the portions 10 and 11 are spaced connecting portions 14, 15 and 16.

The seal may also be defined as comprising a plurality of U-shaped channels, such as the channel having sides formed by the connecting portions 15 and 16, and the bottom formed by the portion 11. Another channel is that having a bottom formed by the portion 10 and sides formed by the connecting portion 14 and a similar portion 17. These channels are connected by the portion 8, previously mentioned, which extends between the edges of the adjacent side portions 14 and 15, thus providing parallel edge corners 18 and 19. Similar edge corners 20 and 21 are formed by the junction of the portions 14 and 15 with the portions 10 and 11, respectively, previously mentioned. Other parallel edge corners are formed at 22 by the junction of the portions 10 and 17, and at 23 by the junction of the portion 9 with a portion 24, which is similar to the portion 17 but is directed in the opposite direction from the portion 17. See also edge corners 25 and 26 formed by the junction of the surfaces of the portion 16 with the parallel portions 9 and 11, respectively.

The portions 17 and 24 along the margins of the strip or seal are in the form of flanges disposed in approximate parallel relation to one another. These flange portions are formed with edge corners 27 and the flange 17 has a lateral extension 28.

The seal described is thus seen to include a plurality of relatively thin flat portions of resilient and deformable rubber composition, which are integrally connected along parallel lines at their edges to form a structure having a series of grooves opening alternately through opposite sides thereof. These grooves are indicated at A, B, C and D, and are formed by the confronting flat surfaces of the portions 14, 15, 16, 17 and 24, while the bottoms of the grooves are formed by the portions 9, 11, 8 and 10.

The multiplicity of parallel edge corners formed by the various intersecting surfaces of the strip portions, mentioned above, afford numerous relatively fine or sharp edges which are effective in providing a fluid tight seal when pressed tightly against the surfaces 5 and 6 of the pipes. As shown in Fig. 2, the sealing strip is severely deformed or distorted when assembled in the pipe joint. In making the seals a suitable length of the strip material having the cross sectional shape illustrated in Fig. 3 is bent or formed into a ring and the ends connected by a suitable adhesion agent, such as rubber cement. This ring or annulus is placed on the spigot 3 of a pipe section and the latter is then thrust into the bell end 4 of the pipe section to be connected thereto. This sealing strip is somewhat wider than the annular space 7 between the confronting surfaces 5 and 6 of the pipes, so that in assembling the pipes the above mentioned deformation occurs. The particular shape to which the seal is distorted is not important since the enumerated edge corners described above are so disposed that it is certain a number of them will engage each of the surfaces 5 and 6 to afford an adequate and tight fluid seal.

The deformation of the sealing strip illustrated in the drawing is one which frequently occurs and shows the edge corners 27, 18 and 25 pressed tightly against the bell surface 5 by the inherent elasticity of the rubber forming the seal strip. Likewise, the resiliency and elasticity of the material forces the edge corners 27 of the flange 24, and the edge corners 21, 26, 20 and 22 of the portions 10 and 11 against the surface 6 of the spigot 3.

By this arrangement a multiplicity of parallel line contact seals is provided that insures a tight connection. Furthermore, the cross sectional shape or configuration of the gasket is such that portions thereof overlap one another in the joint assembly and become tightly compacted, and the resulting pressure exerted against the confronting surfaces 5 and 6 insures that the seal is effective against relatively high pressures developed inside or outside of the pipe. For example, in Fig. 2 the portions 8 and 11 of the seal are pressed tightly against the surfaces 5 and 6, respectively, of the pipes by the intervening or confined portion 15. It is preferable for each three adjacent seal portions, which are apt to be thus pressed together, to be in the aggregate of greater thickness or cross sectional area than the width of the space 7, so that positive compression of the resilient material is insured.

While the portions 14, 15, 16, 17 and 24 may be formed in approximately parallel relation to one another, it is preferable that the confronting surfaces thereof be slightly inclined toward one another so that the openings of the grooves A, B, C and D are slightly narrower than the bottoms thereof. It has been found that if the confronting surfaces of the grooves be inclined toward one another at an angle of about 5 to 15 degrees, preferably about 10 degrees, satisfactory operation in general applications results.

The individual relatively thin flat rubber portions constituting the seal should be considerably wider than thick; for example, each of the portions 14, 15, 16, 17 and 24 should be of the order of about four times as wide as thick. Similarly, the portions 8, 9, 10 and 11 should be of the order of about four times as wide as they are thick. This relationship of the parts affords the maximum of economy in manufacture, as well as providing efficient and long lasting sealing properties.

The principles of the present invention may be utilized in various ways, numerous modifications and alterations being contemplated, substitution of parts and changes in construction being resorted to as desired, it being understood that the embodiments shown in the drawing and described above are given merely for purposes of explanation and illustration without intending to limit the scope of the claims to the specific details disclosed.

What I claim is:

1. A seal comprising an integral structure including a plurality of thin flat strips of deformable and resilient rubber composition having parallel edges and connected together along such edges to form a plurality of channels generally U shaped in cross section when in unstressed condition, each channel having approximately parallel side walls and a flat bottom wall, and to form a flat connecting portion extending between the edges of adjacent channel walls, said connecting portion being disposed in a plane spaced from and generally parallel to the plane of the bottom walls of the channels, whereby, in placing the seal between spaced surfaces the bottoms of adjacent channels can be moved toward one another in their plane and the side wall connected to one such bottom wall can be collapsed to overlie the latter and form therewith and with the connecting portion a continuous rubber body bent into approximately S shape.

2. A seal comprising an integral structure including a plurality of thin flat strips of deformable and resilient rubber composition having parallel edges and connected together along such edges, one group of the strips being disposed in spaced, approximately parallel relation to one another and another group of the strips extending between the spaced parallel edges of the parallel strips to connect the latter together, each edge of the parallel strips having not more than a single connecting strip attached thereto and the connecting strips extending from each of the parallel strips in opposite directions to provide open channels between adjacent parallel strips, each of the strips being several times as wide as thick and the connecting strips being disposed approximately at right angles to the parallel strips.

HARRY P. FISHER.